MULTIPLE FERRITE HEADS WITH WORKABLE METAL SCREENS
Filed June 26, 1961
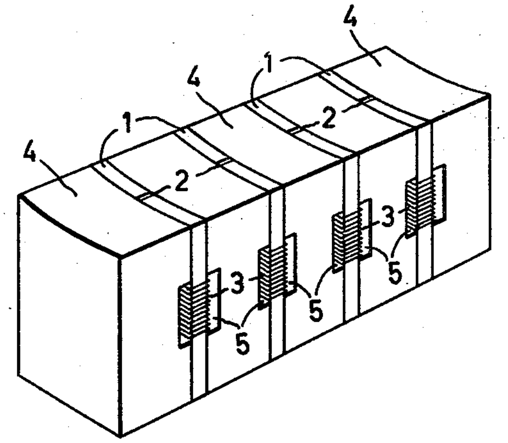
INVENTOR
HERRE RINIA
SIMON DUINKER
BY HENDRIK J. MEERKAMP VAN EMBDEN
AGENT 3,192,608
Patented July 6, 1965

3,192,608

MULTIPLE FERRITE HEADS WITH WORKABLE METAL SCREENS

Herre Rinia, Simon Duinker, and Hendrik Johannes Meerkamp Van Embden, Eindhoven, Netherlands, assignors to North American Philips Company, Inc., New York, N.Y., a corporation of Delaware Filed June 26, 1961, Ser. No. 119,440
Claims priority, application Netherlands, July 26, 1960, 254,218
3 Claims. (Cl. 29—155.5)

The invention relates to a multiple recorder head for recording, reproducing and/or erasing information recorded on a magnetic carrier, in which the individual heads have a magnetic circuit consisting of sintered oxidic ferro-magnetic material known as ferrite and in which a non-magnetic material is provided between the individual heads. The non-magnetic material serves for the mutual fixing of the individual heads.

In the known multiple magnetic recorder heads, this non-magnetic material consists of moulding resin, of materials such as glass, quartz, non-magnetic ceramic material, etc., or of metal. The use of moulding resin and of the materials such as glass, quartz, or non-magnetic ceramic material, has the drawback that no magnetic screening between the individual heads is obtained; therefore, special screening means must be used for suppressing cross-talk effects between adjacent heads when these materials are used.

The use of metal avoids this drawback. The invention relates in particular to multiple magnetic recorder heads, in which the said non-magnetic material consists of metal.

In many cases it is desirable or even necessary, when using multiple magnetic recorder heads, that the bearing surfaces of the individual heads be very accurately flush with the limiting surfaces of the non-magnetic material facing the magnetic carrier.

This desirability becomes apparent, for example, when the signal to be recorded or to be reproduced corresponds to a magnetization pattern on the carrier which has a wave length of the order of magnitude of 5 microns; this as may be the case for example when recording video information on magnetic drums. In this case it is required that the distance from the drum to the multiple head at the useful gaps be less than 1 micron; in principle this is achieved by giving the bearing surface of the multiple head a suitable cylindrical shape, so that the head is kept floating in a stable manner by a pressure spring against the upward force of the airfilm dragged along by the drum. When this is done, however, it is necessary that unevennesses of the bearing surface be kept within fractions of microns so as to meet the required stability conditions.

In general, the bearing surfaces of the individual heads are provided only when the individual heads are already mutually fixed by the non-magnetic material; therefore, when the bearing surfaces and the said limiting surfaces must be flush, a requirement imposed on the non-magnetic material is that it be readily workable with the sintered oxidic ferromagnetic material of the magnetic circuits of the individual heads.

According to the invention, this requirement of workability with the sintered oxidic ferromagnetic material is met in particular by metals, the impact strength of which lies between 0.5 and 10 kg./cm., the bending strength of which lies between 10 and 45 kg./mm.$^2$ and the hardness of which lies between 425 and 480 V10.

The invention also relates to a method of manufacturing such a multiple magnetic recorder head.

According to one aspect of the method according to the invention, plates consisting of non-magnetic material are provided between the individual heads of the multiple head, the plates comprising metal the impact strength of which lies between 0.5 and 10 kg./cm., the bending strength of which lies between 10 and 45 kg./mm.$^2$ and the hardness of which lies between 425 and 480 V10; in addition, the bearing surface of the multiple magnetic recorder head is provided by a simultaneous accurate process of both the magnetic circuits of the individual heads and the plates consisting of non-magnetic material.

In order that the invention may be readily carried into effect one embodiment thereof will now be described in greater detail, by way of example, with reference to the accompanying drawing, the sole figure of which shows a multiple magnetic recorder head according to the invention.

The reference numerals 1 indicate the individual magnetic recorder heads, the magnetic circuit of which consists of sintered oxidic ferromagnetic material. Each of the heads 1 is provided with an interruption 2, the so-called useful gap, which may be filled with a suitable non-magnetic material. Coils 3 are provided on the magnetic circuit of the heads.

For fixing the mutual distance between the individual heads and for consolidating the assembly, the individual heads are provided between spacing plates 4 which are provided with recesses 5 in which the coil sets of the heads are provided.

The limiting surfaces of these spacing plates which, during operation, are facing the magnetic carrier, are flush with the bearing surfaces of the individual heads.

In order to suppress cross-talk effects between the various heads 1 as much as possible, these spacing plates 4 are manufactured from metal.

As already noted above, the bearing surface of the multiple magnetic recorder head is provided only after the heads 1 are already assembled between the spacing plates 4 and the assembly is clamped together. The resulting requirement is that the material of the spacing plates together with the sintered oxidic ferromagnetic material of the magnetic circuit of the heads can easily be polished or otherwise worked.

According to the invention, this requirement is met by metals, the impact strength of which lies between 0.5 and 10 kg./cm., the bending strength of which lies between 10 and 45 kg./mm.$^2$ and the hardness of which lies between 425 and 480 V10.

Examples of such metals are:

(1) Metal of the composition:

66% by weight of Cu
30% by weight of Sn
2% by weight of As
2% by weight of Si.

The impact strength of this material, measured in a number of experimental plates, lies between 3 and 7 kg./cm., the bending strength between 25 and 42 kg./mm.$^2$ and the Vickers hardness V10 between 450 and 460.

(2) Metal of the composition:

58% by weight of Cu
38% by weight of Sn
2% by weight of As
2% by weight of Si.

The impact strength of this material lies between 0.6 and 0.8 kg./cm., the bending strength between 17 and 18 kg./cm.$^2$ and the Vickers hardness between 464 and 473.

(3) Metal of the composition:

66% by weight of Cu
30% by weight of Sn
2% by weight of P
2% by weight of Si.

The impact strength in this case lies between 1.5 and 2 kg./cm., the bending strength between 21 and 28 kg./mm.$^2$ and the Vickers hardness between 433 and 464.

Deviations in only one of the above quantities, i.e., impact strength, bending strength and hardness, outside the ranges given above, are sufficient to make the material unsuitable for the purposes of invention.

Examples of unsuitable materials are:

(1) Metal of the composition:

66% by weight of Cu
30% by weight of Sn
2% by weight of Sb
2% by weight of Si

The impact strength of this material lies between 0.5 and 0.6 kg./cm., the bending strength is approximately 7.5 kg./mm.$^2$ and the Vickers hardness is approximately 440. This material is too porous for being readily machinable with the sintered oxidic ferromagnetic material of the magnetic circuits of the individual heads.

Likewise too porous is:

(2) Metal of the composition:

67% by weight of Cu
31% by weight of Sn
2% by weight of Si the Vicker hardness of which lies between 503 and 530.

Too brittle for machining is:

(3) Metal of the composition:

70% by weight of Cu
26% by weight of Sn
2% by weight of As
2% by weight of Si the Vickers hardness of which lies between 536 and 548.

Examples of materials which are too tough for being readily machinable with the sintered oxidic ferromagnetic material are:

(4) Metal of the composition:

91% by weight of Cu
9% by weight of Ti

In this case the impact strength lies between 26 and 32 kg./cm., the bending strength between 57 and 64 kg./mm.$^2$ and the Vickers hardness between 283 and 285.

(5) Metal of the composition:

50% by weight of Cu
50% by weight of Cd

The impact strength of this material lies between 2.5 and 5.5 kg./cm., the bending strength between 12 and 14 kg./mm.$^2$ and the Vickers hardness between 314 and 322.

What is claimed is:

1. A method of manufacturing a multiple magnetic head including a plurality of individual magnetic heads composed of ferrite, each individual head having a bearing surface adapted to be placed adjacent a moving magnetic carrier, comprising: placing a plate consisting of metallic non-magnetic material between each pair of ferrite heads, each plate having a bearing surface extending substantially flush with the bearing surfaces of the magnetic heads, said non-magnetic material having an impact strength lying between 0.5 and 10 kg./cm., a bending strength lying between 10 and 45 kg./mm.$^2$, and a hardness lying between 425 and 480 V10, and simultaneously machining the bearing surfaces of the magnetic heads and the plates, whereby a multiple magnetic head is produced having a substantially smooth surface adapted to co-act with said moving magnetic carrier.

2. A method as defined in claim 1, wherein said metallic non-magnetic material has a composition of 66% by weight of Cu, 30% by weight of Sn, 2% by weight of Si and 2% by weight of As and P respectively.

3. A method as defined in claim 1, wherein said metallic non-magnetic material has a composition of 58% by weight of Cu, 38% by weight of Sn, 2% by weight of Si and 2% by weight of As.

References Cited by the Examiner

UNITED STATES PATENTS 2,921,143 1/60 Selsted et al. -------- 179—100.2

WHITMORE A. WILTZ, *Primary Examiner.*

BERNARD KONICK, *Examiner.*